US009976868B2

(12) United States Patent
Parekh et al.

(10) Patent No.: US 9,976,868 B2
(45) Date of Patent: May 22, 2018

(54) 4D TEMPORAL DATA STRUCTURES FOR VISUALIZATION OF ALTERNATIVE MISSION PLANS OVER TIME

(71) Applicants: Devang R. Parekh, San Diego, CA (US); Feng Cao, San Diego, CA (US); Henry H. Fung, San Diego, CA (US); Louis Oddo, Carlsbad, CA (US); William Parsons, Valley Center, CA (US); Miteshkumar K. Patel, San Marcos, CA (US)

(72) Inventors: Devang R. Parekh, San Diego, CA (US); Feng Cao, San Diego, CA (US); Henry H. Fung, San Diego, CA (US); Louis Oddo, Carlsbad, CA (US); William Parsons, Valley Center, CA (US); Miteshkumar K. Patel, San Marcos, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 176 days.

(21) Appl. No.: 15/059,953

(22) Filed: Mar. 3, 2016

(65) Prior Publication Data

US 2017/0254664 A1  Sep. 7, 2017

(51) Int. Cl.
*G01C 21/36* (2006.01)
*G08G 5/00* (2006.01)

(52) U.S. Cl.
CPC ..... *G01C 21/3667* (2013.01); *G01C 21/3694* (2013.01); *G08G 5/003* (2013.01)

(58) Field of Classification Search
CPC .. G08G 5/0021; G08G 5/0039; G08G 5/0034; G08G 1/144; G08G 5/0069;
(Continued)

(56) References Cited

U.S. PATENT DOCUMENTS 7,530,105 B2   5/2009 Gilbert et al.
8,918,280 B1  12/2014 Heinrich
(Continued)

OTHER PUBLICATIONS da Costa, Paulo Cesar G., Kathryn Blackmond Laskey, and K. C. Chang. "PROGNOS: applying probabilistic ontologies to distributed predictive situation assessment in naval operations." (2009).

*Primary Examiner* — Jelani A Smith
(74) *Attorney, Agent, or Firm* — Tarolli, Sundheim, Covell & Tummino LLP (57) ABSTRACT

A non-transitory computer readable medium having computer executable instructions stored thereon is provided. The computer executable instructions include a mission definition file (MDF) that includes mission data that describes alternative routes generated by at least one mission planner for a vehicle. An MDF parser extracts the mission data for the alternative routes from the MDF and maps the mission data into a temporal data structure describing the alternative routes. The temporal data includes a route list to describe the alternative routes for the vehicle and a route segment list to describe an estimated time between each of the waypoints for each segment of the route list. A waypoint list describes a latitude, a longitude, and an altitude for each of the waypoints and a mission plan constructor generates a network topology of a mission plan depicting the alternative routes for the vehicle over time.

19 Claims, 7 Drawing Sheets

(58) Field of Classification Search
CPC .. G01C 21/3415; G05D 1/101; G05D 1/0088; G05D 1/042
See application file for complete search history.

(56) References Cited

U.S. PATENT DOCUMENTS

| | | | |
|---|---|---|---|
| 2008/0062167 A1* | 3/2008 | Boggs | G06F 17/5004 345/419 |
| 2008/0243317 A1* | 10/2008 | Morales De La Rica | G05D 1/101 701/11 |
| 2014/0249744 A1* | 9/2014 | Andersson | G01C 21/3415 701/410 |
| 2015/0339930 A1* | 11/2015 | McCann | G08G 5/0039 701/528 |
| 2017/0018184 A1* | 1/2017 | Northrup | G08G 1/144 |

\* cited by examiner

FIG. 1

EXAMPLE 4D DATA STRUCTRE

Route Segment List (220):
s1: (wp1, wp2), ETT1
s2: (wp2, wp3), ETT2
s3: (wp3, wp4), ETT3
s4: (wp4, wp5), ETT4
s5: (wp3, wp6), ETT5
s6: (wp6, wp7), ETT6
s7: (wp7, wp5), ETT7
s8: (wp7, wp8), ETT8

Waypoint List (210):
wp1: (latitude1, longitude1, altitude1)
wp2: (latitude2, longitude2, altitude2)
wp3: (latitude3, longitude3, altitude3)
wp4: (latitude4, longitude4, altitude4)
wp5: (latitude5, longitude5, altitude5)
wp6: (latitude6, longitude6, altitude6)
wp7: (latitude7, longitude7, altitude7)
wp8: (latitude8, longitude8, altitude8)

Route List (230):
R1: (s1, s2, s3, s4)
R2: (s1, s2, s5, s6, s7)
R3: (s1, s2, s5, s6, s8)

Route Leg List (240):
L1: (s1, s2)
L2: (s1, s2, s5, s6)
L3: (s3, s4)

4D TEMPORAL DATA STRUCTURES FOR VISUALIZATION OF ALTERNATIVE MISSION PLANS OVER TIME

TECHNICAL FIELD

This disclosure relates to manned and unmanned vehicle interfaces, and more particularly to a system and method to provide temporal data structures to enable analysis and comparison of alternative mission plans of manned and unmanned vehicles over time.

BACKGROUND

Typical mission plan interface software for a general manned or unmanned vehicle allows operators to plan the tasks to be executed by each vehicle via a graphical user interface that includes various input and output options for feedback and control of the planning process. The graphical user interface typically provides a three-dimensional presentation that includes latitude, longitude, and altitude information in the display output relating to a proposed mission plan during pre-mission planning and also allows monitoring and control of real-time mission progress during mission execution. This includes updating way points, aborting plans, allowing manual override, and so forth. Typical graphical user interfaces to existing mission planning and control systems have limited abilities to analyze how changes to the current environment will impact tasks planned for execution in the future. This usually consists of limited abilities to visually compare the current iteration of a single plan for a single vehicle with the previous iteration of the same plan. Comparison is typically performed visually by a human operator comparing the route and each individual task within the mission plan against defined mission success criteria. Some methods attempt to provide computational metrics that quantify the performance of one or more aspects of the mission plan. These current methods are slow and manually cumbersome at evaluating the mission plan's performance for a single vehicle. Current methods are also typically tied to a single mission planner designed for a single specific vehicle further restricting their ability to evaluate alternatives for other vehicles of the same domain type or other vehicles of different domain types.

One issue with current vehicle interface software is that new plans or alternative options to existing plans are developed by mission planning systems that do not export time as an explicit parameter of the mission plan. While the notion of time is used internally by the mission planning system when planning a mission, the lack of time as a specific output parameter in the mission plan makes evaluation of timing constraints for a single plan difficult and comparison of alternative options extremely complex. This results in longer plan evaluation and approval times having negative consequences in time constrained environments.

SUMMARY

This disclosure relates to temporal data structures to enable analysis and comparison of alternative mission plans of manned and unmanned vehicles over time. In one example, a non-transitory computer readable medium is provided having computer executable instructions stored thereon. The computer executable instructions include a mission definition file (MDF) that includes mission data that describes alternative routes generated by at least one mission planner for a vehicle. An MDF parser extracts the mission data for the alternative routes from the MDF. The MDF parser maps the mission data into a temporal data structure describing the alternative routes. The temporal data structure includes a route list to describe the alternative routes for the vehicle. Each alternative route is defined by at least one segment to connect between waypoints. A route segment list describes an estimated time between each of the waypoints for each segment of the route list. A waypoint list describes a latitude, a longitude, and an altitude for each of the waypoints for each segment of the route list. A mission plan constructor generates a network topology of a mission plan depicting the alternative routes for the vehicle over time by graphing list data from the temporal data structure for the alternative routes.

In another example, a system includes a memory to store computer-executable instructions a processor to execute the computer-executable instructions from the memory. The computer-executable instructions include a mission definition file (MDF) that includes mission data that describes alternative routes generated by at least one mission planner for a vehicle. An MDF parser extracts the mission data for the alternative routes from the MDF. The MDF parser maps the mission data into a temporal data structure describing the alternative routes. The temporal data structure includes a route list to describe the alternative routes for the vehicle. Each alternative route is defined by at least one segment to connect between waypoints. A route segment list describes an estimated time between each of the waypoints for each segment of the route list. A waypoint list describes a latitude, a longitude, and an altitude for each of the waypoints for each segment of the route list. A mission plan constructor generates a network topology of a mission plan depicting the alternative routes for the vehicle over time by graphing list data from the temporal data structure for the alternative routes. A graphical user interface (GUI) displays a visualization of the network topology generated by the mission plan constructor from the temporal data structure. The alternative routes can be viewed concurrently in the visualization to enable determination of what-if alternative mission plan scenarios for the one or more vehicles.

In yet another example, a method includes parsing a mission data file into an initial temporal data structure establishing a mission network structure. The method includes extrapolating estimated segment transition times for each segment of the mission network structure. This includes extracting task timing constraints from input tasking to populate an action list. The method includes extracting specified task constraints to populate an action point data list. The method includes outputting the temporal data structure after populating the lists. The temporal data structure includes the action list and the action data point list. This includes a route list to describe alternative routes for the vehicle. Each alternative route is defined by at least one segment to connect between waypoints. A route segment list describes an estimated time between each of the waypoints for each segment of the route list. A waypoint list describes a latitude, a longitude, and an altitude for each of the waypoints for each segment of the route list.

DETAILED DESCRIPTION

This disclosure relates to manned and unmanned vehicle interfaces, and more particularly to a system and method to provide temporal data structures to enable analysis and comparison of alternative mission plans of manned and unmanned vehicles over time. The data structures enable automated modules to determine when planned actions will be performed as well as to automatically project the execution time of planned actions into the future driven by changes to the timing of events occurring prior to the planned actions. Temporal data structures can be constructed to enable analysis and comparison of alternative mission plans of manned and unmanned vehicles over time. Mission plans consist of one or more tasks to be executed and one or more routes for vehicles to traverse to accomplish such tasking. The data structures and associated interfaces are independent of any one mission planning system and any one vehicle domain type. This can be used in all phases of a mission including pre-mission planning, real-time mission execution, and post-mission analysis, for example.

In one aspect, a non-transitory computer readable medium having computer executable instructions stored thereon is provided. The computer executable instructions include a Mission Definition File (MDF) that includes mission data that describes alternative plans generated by at least one mission planner for at least one vehicle. If desired, one of the alternative plans can be designated as the primary route. A four dimensional (4D) mission plan constructor parses the MDF and extracts the mission data for the alternative plans that may be included from the mission definition file. The 4D mission plan constructor maps the mission data into a 4D temporal data structure describing the alternative plans that may exist. Items in the 4D data structure that are not directly mapped back to items in the MDF, such as Estimated Transit Times (ETT) of specific portions of a mission route, can either be extrapolated from exiting data items in the MDF or computed using models of the vehicle, environmental models, and mathematical time extrapolation methods over distances traversed.

The temporal data structure (also referred to as 4D data structure) makes time an explicit parameter enabling automated methods to perform analysis and comparison of multiple plan alternatives. The 4D data structure captures the topology of a mission plan and all its alternative options in a network structure. Included in the topology are estimated times of arrival at intermediate points in the plan as well as estimated transit times along the various plan segments. Times of planned actions are specified as offsets from various estimated time of arrival points. This enables determination of the absolute time the action is planned to be performed by a straight-forward addition and the ability to project the execution of the planned action to some point in the future given changes to the timing of events occurring prior to the planned action. This explicit use of time estimation and execution time projection enables automated modules to determine if a specific action in the plan can be expected to be executed at the time specified. Also, if the automated modules detect that an action will not be executed as planned, they can predict how much sooner or later than planned the action can be performed. This enables a system to provide automated alerts to the operator raising awareness that an action planned in the future may not be executed by the time specified. Since the 4D data structure is vehicle independent, different plans for different vehicles can be compared to determine which vehicle satisfies or fails to satisfy specified timing criteria.

By adding time to the temporal data structure, not only are three dimensional positional coordinates accounted for in the mission network topology but a fourth dimensional (4D) component specifying a planned time for execution of mission actions is also provided. The data structures provide a common data model to enable construction of visualizations depicting alternative plan actions for analysis and comparison. This allows mission operators to conduct what-if scenario analysis of current or alternative mission plans in a rapid and cognitively digestible manner. Thus, the data structures provide a common format in which to map disparate mission data from independent external mission planners. The common data format also enables rapid construction of fused visualizations of primary and alternative plans of manned and unmanned vehicles since each component of the visualization can be constructed from the same common data format.

Figure 1:
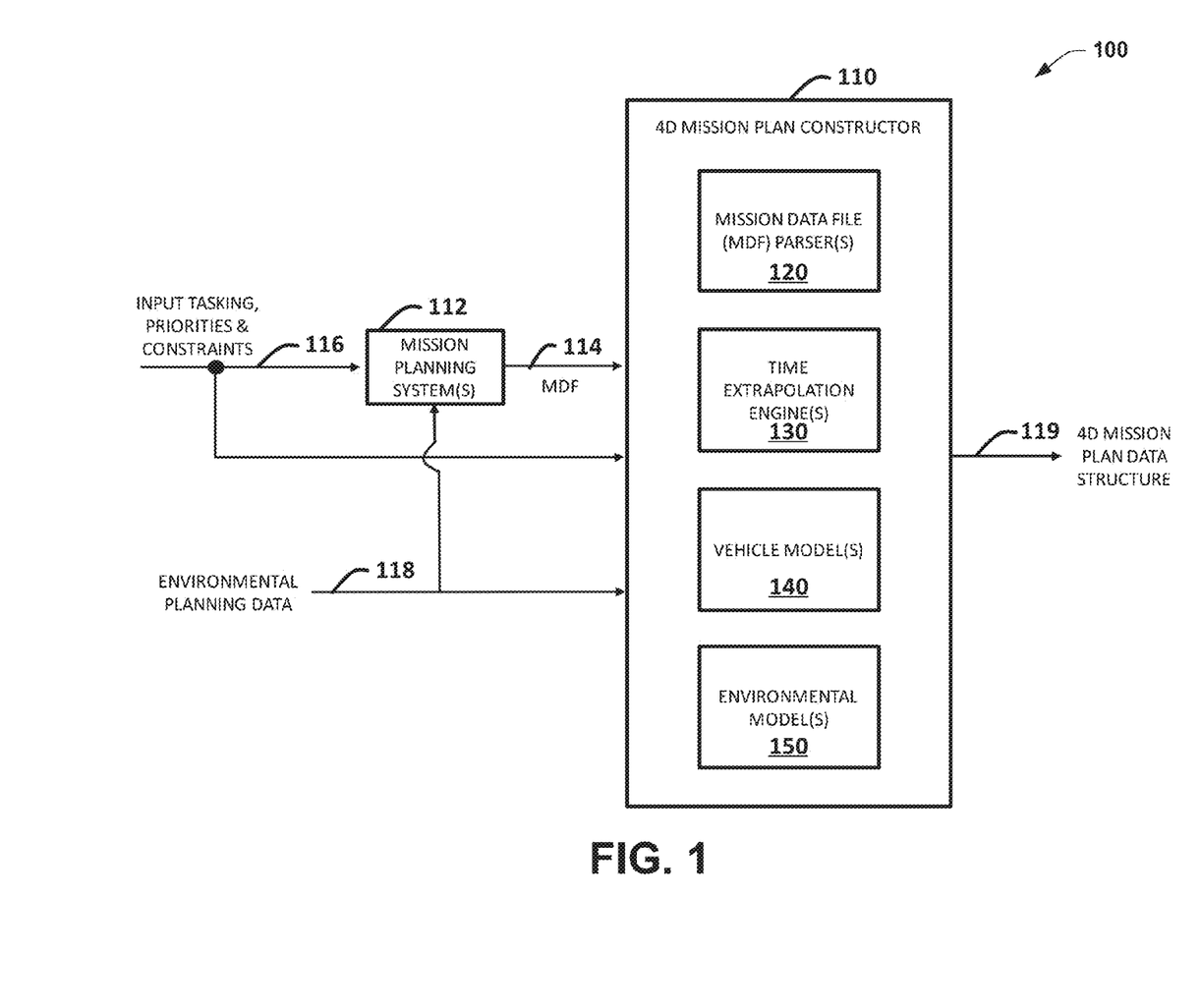
FIG. 1 illustrates a schematic diagram of an example system to automatically construct 4D temporal mission plan data structures.

FIG. 1 illustrates an example system 100 to automatically construct 4D temporal mission plan data structures. As used herein, the term unmanned vehicles can include unmanned vehicles of different domain types such as unmanned ground vehicles (UGV), unmanned underwater vehicles (UUV), unmanned surface vehicles (USV), unmanned aerial vehicles (UAV), and unmanned space vehicles. Also, the term vehicle can include both manned and unmanned vehicles of different domain types. Also, the term 4D refers to a data structure or configuration where both three dimensional position coordinates and time is accounted for as an additional dimension (e.g., $4^{th}$ dimension) for present and/or future visualizations generated in the system 100. Also, the systems and components described herein can be executed as computer readable instructions via one or more processors that read the respective instructions from a non-transitory computer readable medium. The modules described in the system 100 can be executed by a processor (not shown) as computer-executable instructions that reside in a memory (not shown).

The system 100 includes two or more cooperating modules to generate the temporal data structures described herein. These modules include a 4D mission plan constructor 110 and at least one independent mission planning system 112 that generates one or more mission plans for one or more vehicles. The output of the mission planning system 112 is a Mission Data File (MDF) 114 that includes at least one primary mission plan for at least one vehicle. The MDF 114 may include multiple mission plan alternatives, including contingency plans that account for various vehicle failure scenarios, in addition to the primary mission plan. In another example, there may exist multiple independent mission planning systems 112 each producing one or more mission plans and alternatives for one or more vehicles of various types and in various domains (e.g., land, sea, air, space).

Each mission planning system 112 generates its plans driven by input tasking 116 provided by an external entity. For military operations, tasking inputs 116 may come from a central command authority while for commercial operations, tasking may come from a central or distributed order processing system. In most examples, specific tasking 116 is specified to the mission planning system 112 along with associated tasking priorities and optional additional tasking constraints. Execution timing is often an additional constraint placed on input tasking requests 116 and can take the form of specifying a No-Sooner-Than (NST) time of arrival, a No-Later-Than (NLT) delivery of a package, or a fixed time window within which a task may only be performed including both NST and NLT constrained situations.

In addition to tasking requests, priorities, and constraints 116, environmental planning data 118 is also used by the mission planning system 112 when generating a mission plan. Environmental planning data 118 can include orbital models and gravitational field models for space vehicles, wind velocity vectors, air temperature, and pressure for air vehicles, sea state and sea currents for sea surface vehicles, sea temperature and currents for undersea vehicles, and/or terrain models and road networks for ground vehicles, for example.

The 4D mission plan constructor 110 of system 100 uses the input tasking, priorities and constraints 116, the environmental planning data 118, along with the mission plans contained in the mission data files 114 output by the one or more mission planning systems 112 to construct 4D mission plan data structures 119. The mission data contained within the MDF 114 is parsed by one or more MDF parsers 120. Since each independent mission planning system 112 will likely output a different MDF format, the MDF parser 120 can parse each of the formats (e.g., via mapping tables that map one MDF data entry to a common data format). As the mission data is parsed from the MDF 114, an initial 4D data structure is populated with the mission data that exists.

Since conventional mission planners 112 do not output time as an explicit parameter of their mission plans, time extrapolation engines 130 can be employed to estimate the intermediate times of arrival for vehicles from a current location or waypoint to a subsequent location or waypoint. These engines 130 can include but are not limited to, Kalman filters, Markov filters, Particle filters, Runga-Kutta, Predictor-Corrector, and so forth, for example. The time extrapolation engines 130 can employ vehicle models 140 and environmental models 150 as needed. Vehicle models 140 are vehicle specific and model the physical ability of the vehicle to move over time. Environmental models 150 model environmental effects on vehicle movement. For example, a wind forecast model consisting of wind direction and velocity at mission time in the mission area can be used together with a vehicle model 140 by the time extrapolation engine 130 to estimate times of arrival of a specific air vehicle traveling on its planned route. A system for updating such environmental vehicle models is illustrated and described below with respect to FIG. 6.

Figure 2:
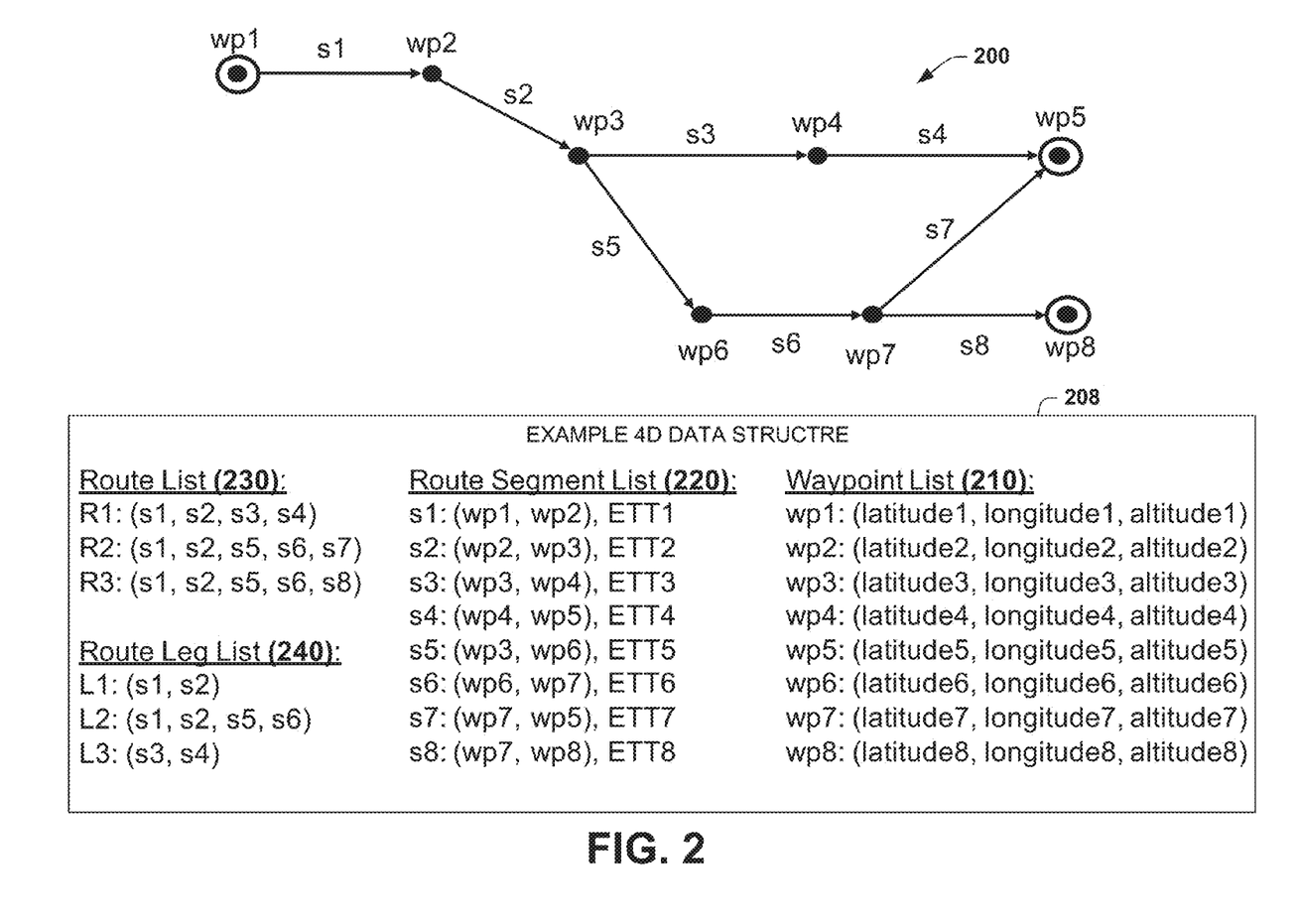
FIG. 2 illustrates an example of the network topology and explicit timing parameters of a 4D data structure.
Figure 3:
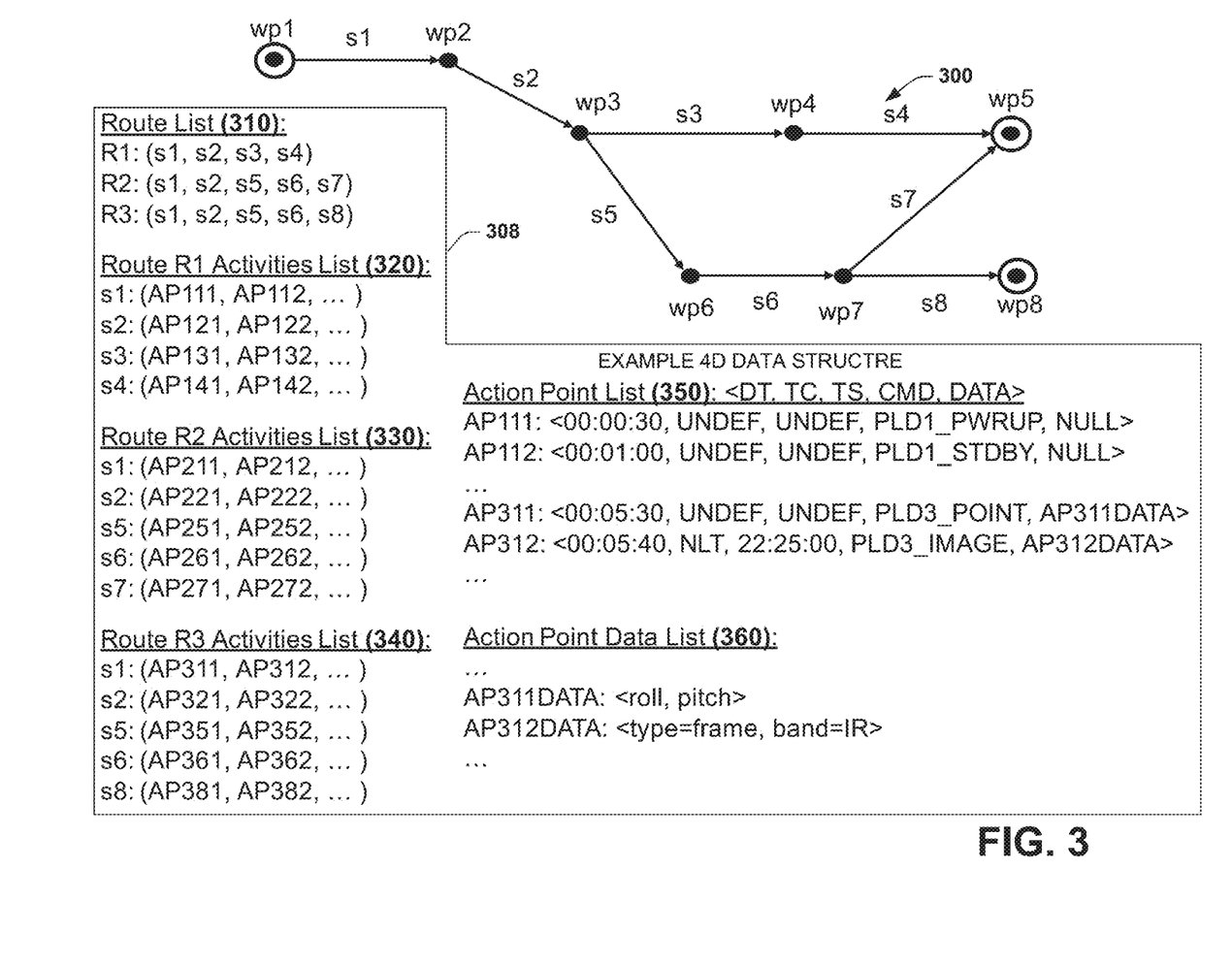
FIG. 3 illustrates an example of additional features of the 4D data structure representing action timing enabling the projection of action execution times into the future.

After completing the estimation of the timing parameters in the 4D mission plan data structure 119, the 4D mission plan constructor 110 adds in the timing constraints specified in the input tasking 116 to the data structure. While not every task in the mission plan will have a timing constraint, those that do can be incorporated into the 4D data structure 119. After completing adding the timing constraints to the 4D data structure, the 4D mission plan data structure 119 is output from the 4D mission plan constructor 110 where it can be employed to generate visualizations of alternative plans for analysis as described herein. FIGS. 2 and 3 illustrate various aspects of the 4D temporal data structures 119 described herein.

FIG. 2 illustrates an example of the network topology 200 and estimated timing parameters of a 4D data structure 208. It is noted that the network topology 200 illustrated is merely one specific example for illustrative purposes. Numerous other network topologies are possible in accordance with the present disclosure. The network topology 200 can be visualized via graphical user interface (not shown) that plots alternative mission plans via the temporal data structures described herein. The network topology of 200 shows a set of waypoints labeled wp1 through wp8. Waypoint wp1 is the start of the network and waypoints wp5 and wp8 are terminating waypoints. The waypoints are specified in a waypoint list 210 as a tuple wherein each waypoint has a specified 3D location (latitude, longitude, and altitude). The waypoints of the network 200 are connected by route segments labeled s1 through s8 and are specified on a route segment list 220. Each route segment of 220 is defined as a directed path between two waypoints and an Estimated Transit Time (ETT). The route segment direction is determined in the order of the waypoints defined. For example, route segment s1 of list 220 is a directed segment from wp1 to wp2 with an estimated transit time (ETT) of ETT1. The ETT for each segment of 220 is determined by one of the extrapolation engines 130 of the system 100 as previously described.

The network topology of 200 defines three routes in this example: R1, R2, and R3, however more or less routes are possible. Each route is specified in a route list 230 by an ordered list of route segments. The routes specified in the route list 230 consist of at least one primary route and optional alternative routes that can be contingency routes or simple alternatives to the primary plan should certain conditions become satisfied during mission execution. In the example of FIG. 2, route R1 could represent the primary route consisting of the ordered segments s1, s2, s3, s4. These ordered segments specify the ordered waypoint destinations wp1, wp2, wp3, wp4, and terminating at wp5. In this example, route R2 of the route list 230 could represent a mission plan alternative that would be chosen for execution should certain conditions become true during mission execution. Route R2 specifies ordered route segments s1, s2, s5, s6, and s7 ending at the same terminating waypoint wp5 as the primary route R1. Finally, route R3 of 230 could represent a contingency route that would be chosen for execution should certain conditions become true during mission execution. Route R3 specifies ordered route segments s1, s2, s5, s6, and s8 ending at a different terminating waypoint wp8 that could represent the contingency recovery location for the vehicle, for example. Estimated times of arrival (ETA) for each waypoint is calculated by the route traversed to arrive at that waypoint. For example, the ETA for waypoint wp5 is different for route R1 than for route R2 which traverses different segments to arrive at the respective location.

Another construct of the network topology 200 is a route leg list 240. The route leg list 240 enables the specification of portions of the network topology 200 that represent specific activities of the mission plan that the operator wants to pay additional attention to and perhaps perform additional analysis of. In the example of FIG. 2, route leg L1 specifies segments s1 and s2 which are common to every other option in the plan. Route leg L2 specifies segments s1, s2, s5, and s6 which define the optional plan leg up to the decision waypoint wp7 where the decision must be made to either complete the optional mission plan and terminate at waypoint wp5, or execute the contingency plan and terminate at waypoint wp8, for example.

FIG. 3 illustrates an example of additional features of a 4D data structure 308 represents action timing enabling the projection of action execution times into the future. For continuity of explanation, a network topology 300 is a replica of the network topology 200 of FIG. 2 and a route list 310 is a replica of the route list 230 of FIG. 2. As noted previously, numerous other topologies and data structures 308 are possible. For each route R1, R2, and R3, in the route list 310, there can be a corresponding route activity list 320, 330, and 340 that specifies the actions that are planned to take place along each segment of the respective route. For example, segment s2 of route R1 has action points AP121, AP122, and others planned for execution. Alternatively, segment s2 of route R2 has activities AP221, AP222, and others planned for execution. Note that the same segment, s2, is capable of having completely different activities planned for it depending on the route it is associated with. This may be necessary as s2 may have one set of activities planned for the primary mission plan that would be different for an optional plan.

The activities for each action points defined in the route activities lists 320, 330, and 340, are specified in an action point list 350. The action point list 350 is a tuple specifying delta time (DT), time constraint (TC), a time specification (TS), an action command (CMD), and data (DATA) needed to execute the command (CMD). In the example illustrated, segment s1 of route R1 activities list 320, specifies action point AP111 as a planned action. Action point list 350 specifies action point AP111 occurs 30 seconds (DT=00:00:30) after capturing the starting waypoint wp1, specified on route segment list 230 of FIG. 2. Action point AP111 is a power up command for payload 1 (CMD=PLD1_PWRUP) that requires no data (DATA=NULL). Action point AP111 has no time constraint (TC=UNDEF), and no time specified (TS=UNDEF). In another example, action point AP312 is specified as an action for segment s1 on route R3 (340). Action point list 350 specifies action point AP312 occurs 5 minutes and 40 seconds (DT=00:05:40) after capturing the starting waypoint wp1, specified on route segment list 230 of FIG. 2. Action point AP312 is an image collection command for payload 3 (CMD=PLD3_IMAGE). The image has timing constraints specifying the image be collected No-Later-Than (TC=NLT) 22:25:00 mission time (TS=22:25:00). Additional data required to properly specify this example image collection is specified in the action point data list 360 in the AP312DATA record pointed to by the DATA field in the action point list 350 (DATA=AP312DATA). In this example, the AP312DATA record of the action point data list 360 specifies the image collection to be a frame image (type=frame) in the infrared waveband (band=IR), for example.

By specifying the example network topology of a mission in the manner described in FIG. 2 and FIG. 3, multiple mission options can be defined by simply adding mission routes to the route lists 210 and 310. By separating mission route activities into separate lists, one for each route, completely different activities can be specified for the same segment depending only on the mission route the segment it is referenced by. By specifying action points as delta time offsets from established nodes in the mission network, projecting the execution of an action into the future can be accomplished by simply adding the segment estimated transition times (ETT) enabling automated modules to rapidly determine the impacts of changes to the timing of events occurring prior to the planned action. This functional capability enables predictive analysis, for example.

Figure 4:
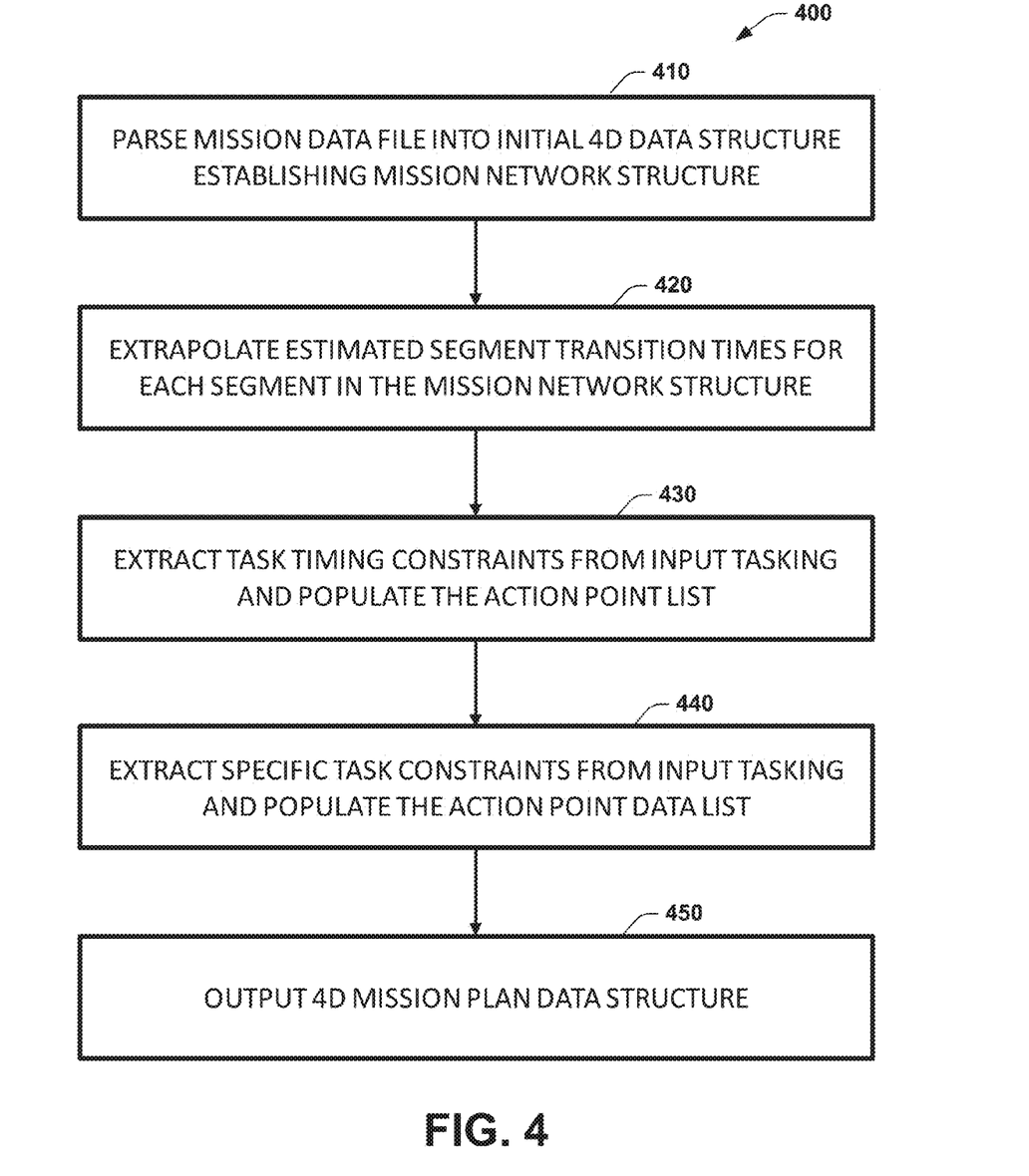
FIG. 4 illustrates an example method to automatically construct 4D temporal mission plan data structures.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 4 illustrates an example method 400 to automatically construct 4D temporal mission plan data structures. At 410, the method 400 parses the input mission data file (MDF) initializing the mission network structure illustrated in FIG. 2 and FIG. 3 (e.g., via parser 120 of FIG. 1). At 420, the method 400 extrapolates the estimated transition times (ETT) for each segment in the mission network structure (e.g., via time extrapolation engine 130 of FIG. 1). This process makes use of time extrapolation engines, vehicle models, and environmental models as previously described in FIG. 1. At 430, the method 400 extracts the timing constraints from the input tasking and populates the delta time (DT), timing constraint (TC), and time specification (TS) fields of the action point list illustrated in FIG. 3 (e.g., via mission plan constructor 110 of FIG. 1). At 440, the method 400 extracts the detailed task constraints from the input tasking and populated the action point data list of FIG. 3 (e.g., via mission plan constructor 110 of FIG. 1). Upon completion, at 450, the method 400 outputs the 4D mission plan data structure for use by other analysis systems to perform projection of actions planned at future points in time based on events that change the timing of actions at earlier points in the mission plan.

The temporal data structure includes the action list and the action data point list. This includes a route list to describe alternative routes for the vehicle. Each alternative route is defined by at least one segment to connect between waypoints. A route segment list describes an estimated time between each of the waypoints for each segment of the route list. A waypoint list describes a latitude, a longitude, and an altitude for each of the waypoints for each segment of the route list. The method 400 can also include updating the route segment list to include a list of segments with each segment defined as two waypoints, each of the two waypoints having an estimated time of arrival field to denote the estimated time elapsed to travel between the two waypoints.

Figure 5:
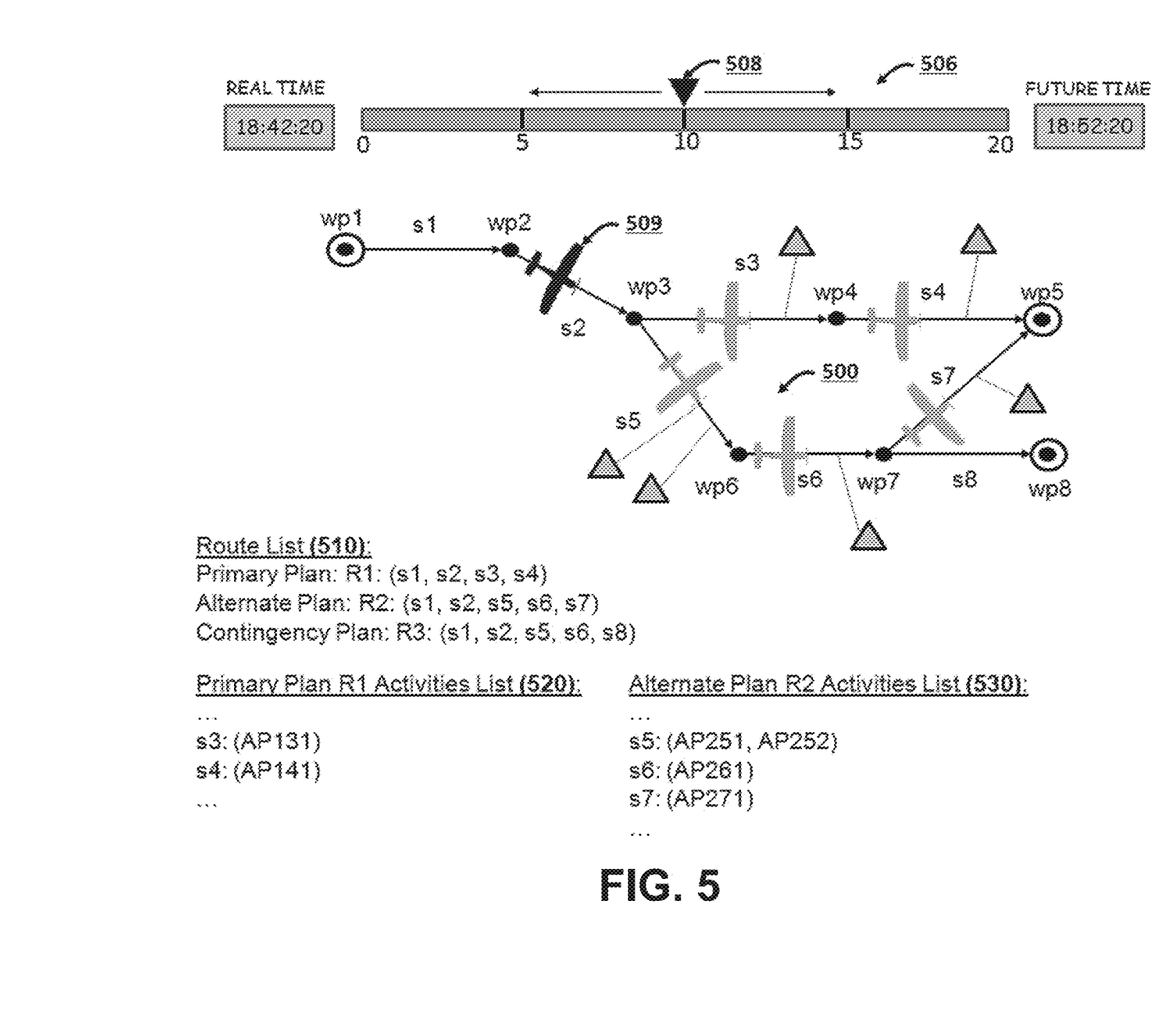
FIG. 5 illustrates an example of a type of predictive analysis enabled by a 4D data structure.

FIG. 5 illustrates an example of a type of predictive analysis enabled by a 4D data structure described herein. At 508, is an example of a time indicator. The time indicator 506 depicts the current time (real time) and some future time specified by the operator via time input 508. The selection of the future time is accomplished by moving the time input 508 at 506 to an offset time that is added to the current real-time. In this illustration, the offset at 508 is set at 10 minutes with the offset added to the real-time of 18:42:20 to determine the future time 18:52:20. A time interval assessment system (See e.g., FIG. 6) can be employed to propagate the state of the vehicle to the future time selected. In FIG. 5, a black air vehicle 509 represents the current position of the air vehicle based on real-time position reports from the air vehicle. The depicted grey vehicles represent future positions of the air vehicle propagated along the primary plan (R1 of 510) and the alternate plan (R2 of 510).

Future actions that are to be performed for each plan are depicted as grey triangles with lines indicating where along the plan they are to be performed. In the example of FIG. 5, the primary plan has two actions to be performed in the future; AP131 of 520 on segment s3 and AP141 of 520 on segment s4. The alternative plan has four actions to be performed defined on the activities list 530. The 4D data structure enables automated modules of an interval assessment system (See e.g., FIG. 6) to project the state of the air vehicle to the selected future time to determine if the planned actions can be performed at a future time that satisfies their timing constraints. For example, if the primary plan of FIG. 5 was developed by a mission planner with a 100 mph head wind, and during mission execution the actual winds were providing a 100 mph tail wind, then the air vehicle depicted in 500 will arrive at waypoint wp3 earlier than planned. The "what-if" question the operator will want to answer is: will the vehicle arrive at wp3 early enough to choose the alternative plan R2 and complete four tasks with specified timing constraints versus staying with the primary plan and completing only two tasks? This is but one example of the type of "what-if" timing analysis enabled by the 4D data structure described herein.

Figure 6:
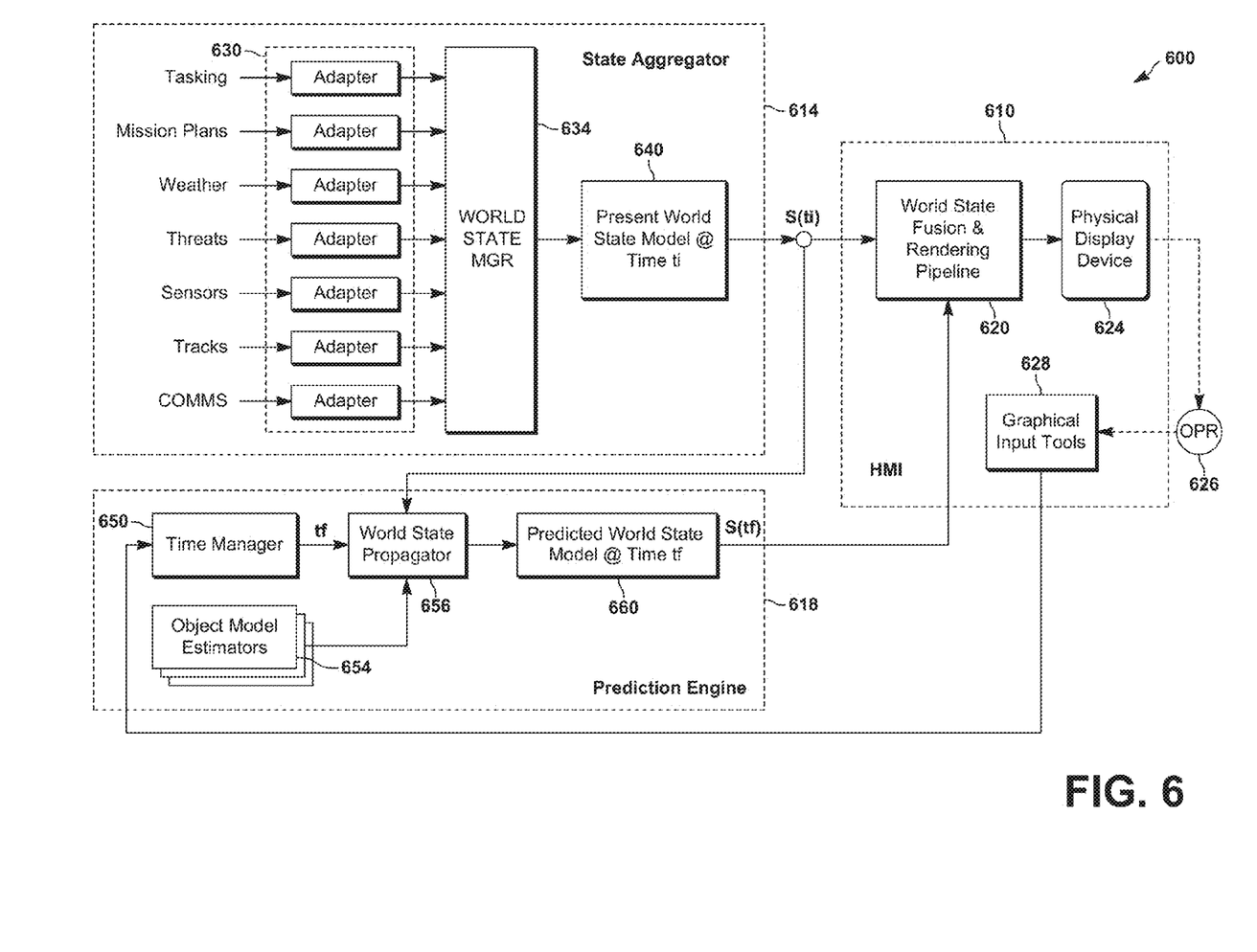
FIG. 6 illustrates a schematic diagram of an example system to provide spatial and temporal forecasting for predictive situation awareness of vehicles and to update contingent data within temporal data structures and models described herein.

FIG. 6 illustrates an example system 600 to provide spatial and temporal forecasting for predictive situation awareness of vehicles and to update contingent data within temporal data structures and models described herein. The system 600 provides a more detailed aspect to the system 100 described above. The system 600 includes a human machine interface (HMI) 610, a state aggregator 614, and a prediction engine 618. The HMI 610 includes a world state rendering pipeline 620 to generate visualizations to an output device 624 that can be viewed by an operator 626. A graphical input 628 can be used by the operator to operate a time slider (See e.g., FIGS. 3-6) to specify current or future times for visualization renderings at the display 624.

The state aggregator 614 receives and processes the various data feeds that constitute a mission. It is generally always on and is processing in real time. It provides the current world state to the HMI 610 and the prediction engine 618. The HMI 610 provides situational awareness in real time of the current world state and can provide fused visualizations of the current world state and alternative future world states. The HMI 610 also includes graphical tools 628 to allow an operator to control the prediction engine 618 enabling the generation of alternative plans projected into the future. The prediction engine 618 has access to the current world state, alternative plans, and receives operator inputs to project the current world state and alternative plans to some point in the future. The prediction engine 618 provides the projected future world state and any projected alternatives to the HMI 610 for fusion and display to the operator 626.

The state aggregator 614 includes static and real-time data feeds that constitute a mission and are received via adapter modules 630 which are processed via world state manager 634. The data feeds can include a mission plan. This data feed originates from various mission planning engines in various formats, and includes the primary route and contingency routes for each platform. Furthermore, it includes the state of a platform (position, velocity, orientation, fuel, and so forth) at periodic increments. This is true for each manned or unmanned vehicle platform along the primary route and contingency routes.

A tasking data feed originates external to the system in various formats and consists of actions to perform. These actions may include Intelligence Surveillance and Reconnaissance (ISR) collections, strike (both kinetic and electronic), communications relay, and the delivery of a payload such as fuel or supplies. Tasking can have constraints that may include a time window within which the action must take place; a location where the action must be performed; and detailed geometric constraints that may include azimuth, elevation, and velocity with respect to the tasking, for example. A weather data feed originates external to the system in various formats and consists of information pertaining to winds, currents, cloud coverage, temperature, humidity, and precipitation. Weather feeds include both current measurements and forecasted conditions.

A threats data feed originates external to the system in various formats and includes threat information (e.g., type of threat, location, and range of threat effectiveness). Threats may also include environmental obstacles such as terrain, bodies of water, icebergs, and cultural obstacles such as power lines, buildings, and towers. A tracks data feed originates external to the system in various formats and includes track information (e.g., entity type, hostile/friendly, location, velocity, orientation). A sensors data feed is per payload type for each asset and consists of data for field of view and field of regard data on position and orientation of the sensor. A COMMS data feed provides they type of communications asset available and its current and planned footprint over time.

Because each of the data feeds delineated above has multiple formats and can change in real-time, and independently of one another, adapters 630 have been created to mediate the various data types to an internal standardized data model managed by the world state manager 634. The world state manager 634 has the responsibility to aggregate the disparate data feeds into a single internal representation and at a single point in time as well as store and manage the internal data model. By extension, other inputs and data feeds may also be aggregated into the internal data model as needed through additional adapters 630.

At a particular time instance, t(i), the aggregation of all the data as captured constitutes the present world state 640 which can be utilized to update contingency data within the data structures described herein (e.g., via the behavior fields). This present world state 640 is updated in real time and, at a minimum, is updated at a 1 Hz rate, for example. The present world state snapshot is made available to the HMI's fusion and rendering pipeline component 620 which automatically renders the state onto a physical display device for the operator 626 to view. The present world state 634 is also provided to the prediction engine 618 for propagation into some future time t(f) specified by the operator.

As noted above, the HMI 610 includes the world state fusion & rendering pipeline 620 which is an event driven component that receives world state updates or changes made by the state aggregator 614 to the present world state 614. It also has the responsibility of fusing the current world state with future world state generated by the prediction engine 618 and rendering the resultant fused information onto the physical display device 624 for the operator 626 to view. The graphical input tools 628 houses graphical components that take inputs from an operator 626. A notional example of an input tool is a timeline slider. This input component displays current time, which is always moving forward, and a future time, which is calculated by an offset that is determined by the operator through sliding a marker along the timeline, in one example. When the operator 626 requests a projection of the world state by method of a graphical input tool 628, the present world state 640 and the offset time are passed into the prediction engine 618 which responds with a projection of the present world state 640 and its alternatives into the specified future point in time S(t(f)) where S is the project state at future time t(f).

The prediction engine 618 includes a time manager 650 that is the master time manager for all visual components of interest. It maintains a master wall clock and a real-time clock for each platform and entity of interest. When it receives an offset time instance, it calculates a future clock instance by adding the real-time (current time) to the offset time for each platform or entity of interest. Since real time consistently moves forward, the time manager 650 has the added responsibility of determining how long the projected state is valid for. After the valid time period has expired, the time manager 650 notifies the system that the projected future world state is no longer valid and that a new projection is required.

One or more object model estimators (or predictors) 654 can be provided as a plug-in framework for creating, loading, and managing behavioral models. These models have a one to one correspondence to the data feeds coming into the state aggregator 614. Each object model estimator 654 includes methods and constraints specific to its associated data feed for projecting that particular data feed into the future. Such methods may include a family of prediction and interpolation algorithms that are appropriate for each respective object behavioral model. The prediction algorithms can include, but are not limited to, Kalman filters, Markov filters, Particle filters, Runga-Kutta, Predictor-Corrector, and so forth.

A world state propagator 656 processes an offset time, current state, and the appropriate object model estimators, and propagates them from the present state to a specified future state. This component 656 conducts this action for each object model. Upon completion of all the models, the predicted world state is aggregated at 660 and sent to the world state fusion & rendering pipeline 620 for display at 644. Output from the predicted world state at 660 can also be utilized to update contingency data within the data structures described herein (e.g., via the behavior fields).

Figure 7:
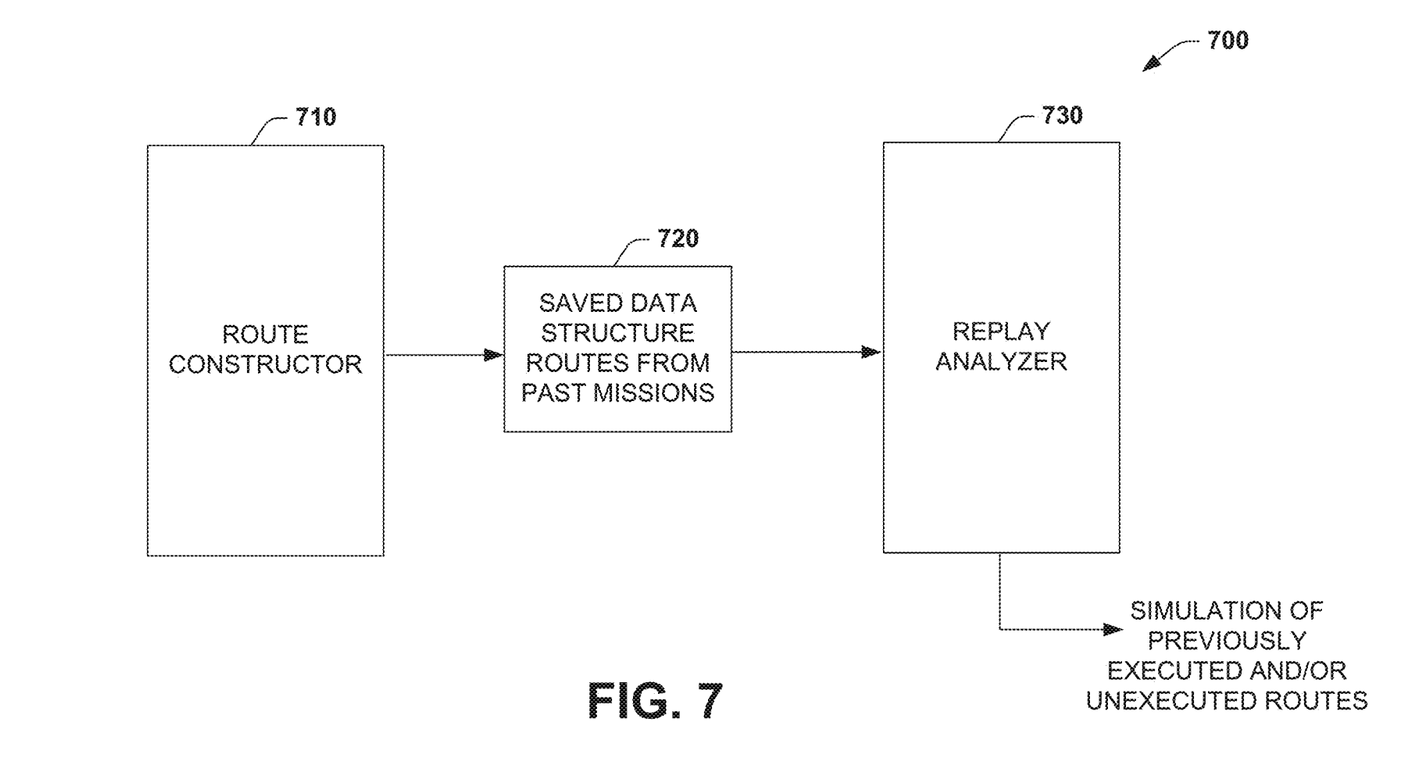
FIG. 7 illustrates an example system to provide replay analysis of data structure routes that have previously been executed or unexecuted during the course of a given mission plan.

FIG. 7 illustrates an example system 700 to provide replay analysis of data structure routes that have previously been executed or unexecuted during the course of a given mission plan. As shown, a route constructor 710 can save data structures 720 for primary and/or alternative routes after time has passed to complete the respective routes. For example, if only the primary route is executed during a given mission, data structures for the primary route and the alternative routes that were not executed can be saved at 720 for use at a later time for mission plan analysis. A replay analyzer 730 can be provided to replay missions after completion of a given mission by processing the executed and/or unexecuted saved data structures 720 from previous missions. The replay analyzer 730 can generate visualizations from the saved data structures 720 to enable simulated analysis of alternative routes that were not executed during the given mission. For example, during a given simulation of a previous mission, a simulation operator can specify that an alternative route should be taken over the primary route. The replay analyzer 730 can retrieve the data structure relating to the selected alternative route from the previous mission and replay the mission as if the alternative route were specified during the mission.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium having computer executable instructions stored thereon, the computer executable instructions comprising:
   a mission definition file (MDF) that includes mission data that describes at least one primary route and alternative routes generated by at least one mission planner for a vehicle;
   a MDF parser to extract the mission data for the at least one primary route and the alternative routes from the mission definition file, the MDF parser maps the mission data into a temporal data structure describing the at least one primary route and the alternative routes;
   the temporal data structure comprising:
      a route list to describe the at least one primary route and the alternative routes for the vehicle, each alternative route defined by at least one segment to connect between waypoints;
      a route segment list to describe an estimated time between each of the waypoints for each segment of the route list; and
      a waypoint list to describe a latitude, a longitude, and an altitude for each of the waypoints for each segment of the route list;
   a mission plan constructor to generate a network topology of a mission plan depicting the at least one primary route and the alternative routes for the vehicle over time by graphing list data from the temporal data structure for the alternative routes;
   an automated module to determine, during a real-time mission associated with the at least one primary route, whether or not a planned action at a future time on at least one of the alternative routes satisfies a timing constraint for the mission plan; and
   a graphical user interface that displays, during the real-time mission, a current position of the vehicle, the alternative routes for the vehicle, and an indication whether or not the planned action on the at least one of the alternative routes satisfies the timing constraint for the mission plan to facilitate selection of a respective one of the alternative routes.

2. The computer readable medium of claim 1, the alternative routes include at least one alternative route identified as a primary route for a manned or unmanned vehicle.

3. The computer readable medium of claim 1, wherein the route segment list further comprises a list of segments with each segment defined as two waypoints, each of the two waypoints having an estimated time of arrival field to denote the estimated time elapsed to travel between the two waypoints.

4. The computer readable medium of claim 1, the temporal data structure further comprising a route leg list to specify portions of the network topology that represent specific activities of a mission plan that an operator wants to place additional attention toward or to perform additional analysis thereof.

5. The computer readable medium of claim 1, the temporal data structure further comprising a route activities list that specifies vehicle actions that are planned to take place along each segment of the respective alternative route.

6. The computer readable medium of claim 1, the temporal data structure further comprising a route action point list that specifies a delta time (DT), a time constraint (TC), a time specification (TS), an action command (CMD), or data (DATA) needed to execute a command (CMD) for a vehicle operating according to the network topology.

7. The computer readable medium of claim 6, the temporal data structure further comprising an action point data list to specify additional data required to describe a specified activity in the action point list.

8. The computer readable medium of claim 6, further comprising a state aggregator to update data feeds supplying at least one vehicle model and at least one environmental model to update data in the temporal data structure in real time, the data feeds include at least one of a tasking feed, a mission plan feed, a weather feed, a threat feed, a sensor feed, a tracks feed, and a communications feed.

9. The computer readable medium of claim 8, further comprising a prediction engine to project the data feeds from the state aggregator and temporal data structure into a future visualization of the alternative routes.

10. The computer readable medium of claim 1, the GUI further comprising a time input to adjust the temporal data structure to specify time projections of the alternative routes over time.

11. A system, comprising:
a memory to store computer-executable instructions; and
a processor to execute the computer-executable instructions from the memory, the computer-executable instructions comprising:
a mission definition file (MDF) that includes mission data that describes at least one primary route and alternative routes generated by at least one mission planner for a vehicle;
a MDF parser to extract the mission data for the at least one primary route and the alternative routes from the mission definition file, the MDF parser maps the mission data into a temporal data structure describing the at least one primary route and the alternative routes;
the temporal data structure comprising:
a route list to describe the alternative routes for the vehicle, each alternative route defined by at least one segment to connect between waypoints;
a route segment list to describe an estimated time between each of the waypoints for each segment of the route list; and
a waypoint list to describe a latitude, a longitude, and an altitude for each of the waypoints for each segment of the route list; and
a mission plan constructor to generate a network topology of a mission plan depicting the at least one primary route and the alternative routes for the vehicle over time by graphing list data from the temporal data structure for the alternative routes;
an automated module to determine, during a real-time mission associated with the at least one primary route, whether or not a planned action at a future time on at least one of the alternative routes satisfies a timing constraint for the mission plan; and a graphical user interface (GUI) to display a visualization of the network topology generated by the mission plan constructor from the temporal data structure, wherein the at least one primary route and the alternative routes can be viewed concurrently in the visualization to enable determination of a what-if alternative mission plan scenario that satisfy the timing constraint for the mission plan for the one or more vehicles to facilitate selection of a respective one of the alternative routes.

12. The system of claim 11, the GUI further comprising a time input to adjust the temporal data structure to specify time projections of the alternative routes over time.

13. The system of claim 11, further comprising a replay analyzer to replay missions from saved temporal data structures after completion of a given mission, wherein the replay analyzer generates visualizations from the saved temporal data structures to enable simulated analysis of alternative routes that were not executed during the given mission.

14. The system of claim 11, wherein the route segment list further comprises a list of segments with each segment defined as two waypoints, each of the two waypoints having an estimated time of arrival field to denote the estimated time elapsed to travel between the two waypoints.

15. The system of claim 11, the temporal data structure further comprising a route leg list to specify portions of the network topology that represent specific activities of a mission plan that an operator wants to place additional attention toward or to perform additional analysis thereof.

16. The system of claim 11, the temporal data structure further comprising a route activities list that specifies vehicle actions that are planned to take place along each segment of the respective alternative route.

17. The system of claim 11, the temporal data structure further comprising a route action point list that specifies a delta time (DT), a time constraint (TC), a time specification (TS), an action command (CMD), or data (DATA) needed to execute a command (CMD) for a vehicle operating according to the network topology.

18. A method, comprising:
parsing a mission data file into an initial temporal data structure establishing a mission network structure;
extrapolating estimated segment transition times for each segment of the mission network structure;
extracting task timing constraints from input tasking to populate an action list;
extracting specified task constraints to populate an action point data list; and
outputting the temporal data structure after populating the lists, the temporal data structure comprising:
the action list and the action data point list;
a route list to describe alternative routes for the vehicle, each alternative route defined by at least one segment to connect between waypoints;
a route segment list to describe an estimated time between each of the waypoints for each segment of the route list; and
a waypoint list to describe a latitude, a longitude, and an altitude for each of the waypoints for each segment of the route list;
determining, during a real-time mission associated with the at least one primary route, whether or not a planned action at a future time on at least one of the alternative routes satisfies a timing constraint for the mission plan; and
displaying, during the real-time mission, a current position of the vehicle, the alternative routes for the vehicle, and an indication whether or not the planned action on the at least one of the alternative routes satisfies the timing constraint for the mission plan to facilitate selection of a respective one of the alternative routes.

19. The method of claim 18, further comprising updating the route segment list to include a list of segments with each segment defined as two waypoints, each of the two waypoints having an estimated time of arrival field to denote the estimated time elapsed to travel between the two waypoints.

\* \* \* \* \*